Feb. 9, 1937. G. E. HICKEY 2,070,548
UTILITY LIGHT
Filed Jan. 13, 1936 2 Sheets-Sheet 1
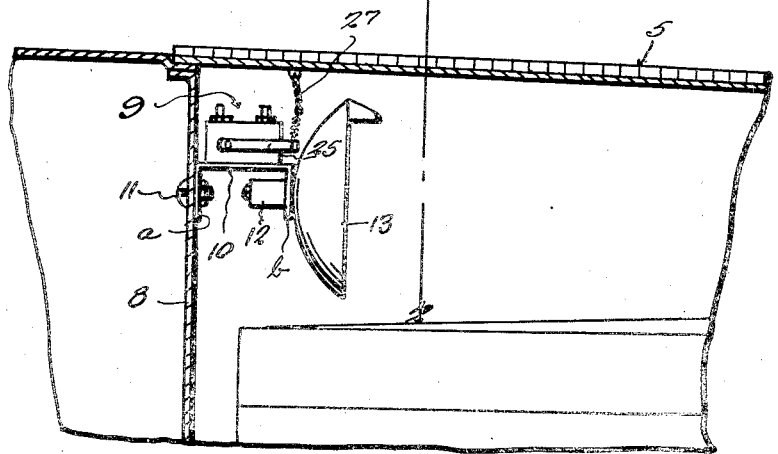
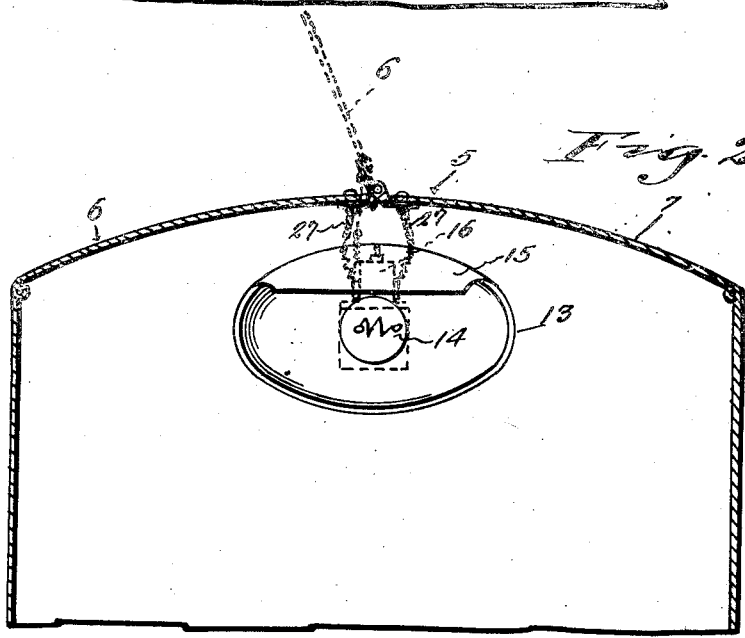
Inventor
George E. Hickey Feb. 9, 1937.  G. E. HICKEY  2,070,548
UTILITY LIGHT
Filed Jan. 13, 1936  2 Sheets-Sheet 2
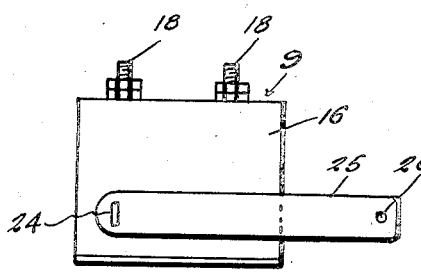
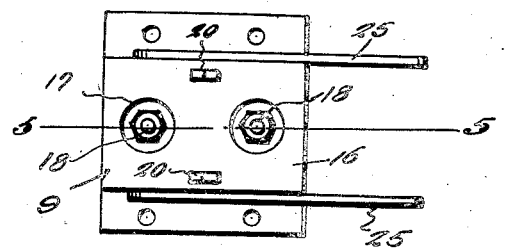
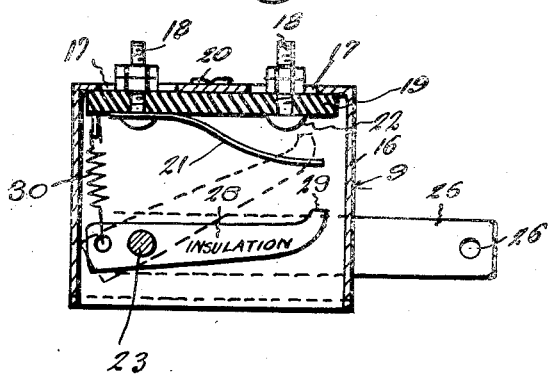
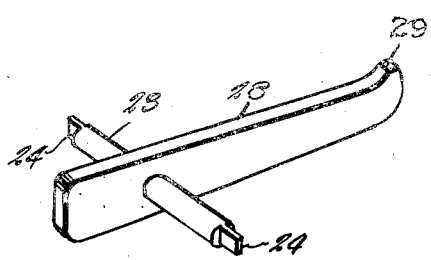
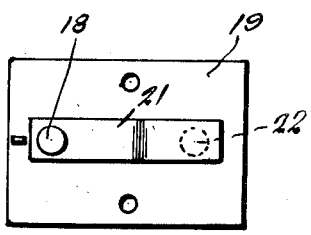
Inventor
George E. Hickey
By Clarence A. O'Brien and Hyman Berman
Attorneys Patented Feb. 9, 1937

2,070,548

UNITED STATES PATENT OFFICE 2,070,548

UTILITY LIGHT

George E. Hickey, Sacramento, Calif.

Application January 13, 1936, Serial No. 58,966

1 Claim. (Cl. 240—7.1)

This invention relates to new and useful improvements in the general art of illumination and more particularly to a utility light for vehicles.

The principal object of the invention is to provide an auxiliary light in the form of an attachment for automobiles and other vehicles either air or land and even marine, wherein the lamp is placed in a compartment having a closure and equipped with switch means for controlling the lamp automatically as the closure to the compartment is opened.

Another important object of the invention is to provide a utility light of simple construction and constructed in such a manner as to permit installation at low cost without difficulty.

Other important objects and advantages of the invention will become apparent to the reader of the following specification.

In the drawings:

Figure 1 represents a fragmentary vertical sectional view through the hood of an automobile showing the utility lamp installed.

Figure 2 represents a fragmentary vertical sectional view taken substantially on line 2—2 of Figure 1.

Figure 3 is a side elevational view of the switch.

Figure 4 is a top plan view of the switch.

Figure 5 is a vertical sectional view through the switch taken substantially on line 5—5 of Figure 4.

Figure 6 is a perspective view of the contact actuator.

Figure 7 is a bottom plan view of the stationary contact plate.

Referring to the drawings wherein like numerals designate like parts, it can be seen in Figures 1 and 2, that numeral 5 generally refers to a hood portion of an automobile which includes the hingedly connected side flaps 6—7. Numeral 8 represents the usual cowl wall on which the switch and lamp assemblies generally referred to by numeral 9 is supported.

This assembly consists of a bracket 10 which is of U-shape having its leg portion a secured to the front side of the cowl wall 8 by suitable means 11, while the other leg portion b has an opening therein for receiving the socket 12 of the lamp which includes a reflector 13 and the bulb 14. The reflector 13 is provided with a beak 15 for casting the light downwardly.

The switch for shutting on and off current to the bulb 14 includes a housing 16 mounted upon the bracket 10 and provided with openings 17 in the top thereof through which the binding post 18—18 projecting upwardly from the dielectric plate 19 can extend to which wires from the source of current (not shown) and from the socket 12 can connect.

The dielectric plate 19 is secured in place by suitable means 20. Secured to the bottom of the dielectric plate 19 is the strip spring contactor 21 having one end anchored to one of the binding posts 18. The other binding post 18 has a contact head 22 which is engageable by the free end of the contactor 21.

Journalled through a pair of opposed side walls of the housing 16 is the shaft 23 the end portions of which are flattened as at 24. The ends of the shaft 23 are disposed into oblong openings in the arms 25 which arms are located outside of the housing 16 and extend forwardly as shown in Figures 1 and 3. The forward ends of these arms 25 are apertured as at 26 and flexible connecting members 27 extend between these apertured ends and hood flaps 6—7 in the manner substantially shown in Figures 1 and 2.

A contact actuator, in the form of a leg member 28, is secured to the shaft 23 and has a foot 29 at its free end, which can engage the spring 21 when the shaft 23 is rotated by actuation of the arms 25 to engage the spring 21 against the contact 22 and thus cause a current supply to the bulb 14. This closing of the switch takes place when the hood flaps 6—7 (one or the other) are lifted, so that immediately upon lifting of the hood the engine is flooded with light.

A coiled extensible spring 30 at one end connected to the end of the leg member 28 opposite from its foot 29 and its opposite end to the plate 19 of insulation thus normally holding the leg member 28 in the position shown in Figure 5.

The foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

In combination, an automobile hood including a pair of swingable closures, a lamp mounted within the hood, a switch mounted within the hood, said switch including a housing provided with a shaft disposed therethrough, an arm on each end of the shaft outside of the housing, a flexible connection between the free end of each of the arms and a corresponding closure, a plate of insulation secured to the inside of the top of the housing, the top of the housing being provided with openings therein, a pair of contact posts on the plate of insulation projecting through the openings in the housing, one of said contact posts being provided with a contact head exposed on the lower side of the insulation plate, a spring contact finger secured to the plate at one end by the second of said contact posts so as to have the other end thereof closely underlie the contact head, a member in the housing secured to the shaft and being adapted to push the spring contact finger against the contact head when the shaft is rocked by motion transmitted to either of the arms by the closure.

GEORGE E. HICKEY.